United States Patent [19]
Suzuki et al.

[11] Patent Number: 5,134,486
[45] Date of Patent: Jul. 28, 1992

[54] TELEVISION SET WITH SATELLITE BROADCAST RECEIVER

[75] Inventors: Masakazu Suzuki, Saitama; Toshihide Hayashi, Kanagawa, both of Japan

[73] Assignee: Sony Corporation, Tokyo, Japan

[21] Appl. No.: 728,362

[22] Filed: Jul. 11, 1991

[30] Foreign Application Priority Data

Jul. 27, 1990 [JP] Japan .................................. 2-00097

[51] Int. Cl.⁵ .............................................. H04N 7/20
[52] U.S. Cl. ..................................... 358/190; 455/343; 358/183
[58] Field of Search ............ 358/190, 139, 181, 191.1, 358/183; 455/343

[56] References Cited

U.S. PATENT DOCUMENTS

| | | | |
|---|---|---|---|
| 4,823,398 | 4/1989 | Hashimoto | 455/343 X |
| 4,858,006 | 8/1989 | Suzuki | 455/343 X |
| 4,903,130 | 2/1990 | Kitagawa et al. | 358/190 |

FOREIGN PATENT DOCUMENTS

| | | |
|---|---|---|
| 2-122783 | 5/1990 | Japan . |
| 2-140084 | 5/1990 | Japan . |
| 2-183686 | 7/1990 | Japan . |
| 3-38190 | 2/1991 | Japan . |
| 2221363 | 1/1990 | United Kingdom . |

Primary Examiner—James J. Groody
Assistant Examiner—Mark R. Powell
Attorney, Agent, or Firm—Lewis H. Eslinger; Jay H. Maioli

[57] ABSTRACT

A television set has a satellite broadcast receiver which includes a BS converter and a BS tuner. A power supply voltage is selectively supplied from the BS tuner to the BS converter. The BS tuner has a selector switch for selecting an "ON" mode in which the power supply voltage is to be supplied on the BS converter, or an "OFF" mode in which the power supply voltage is not to be supplied to the BS converter. A control unit in the BS tuner displays on a CRT a message indicating that the power supply voltage is not supplied to the BS converter if the selector switch is selecting the "ON" mode and no BS program is being received.

3 Claims, 4 Drawing Sheets

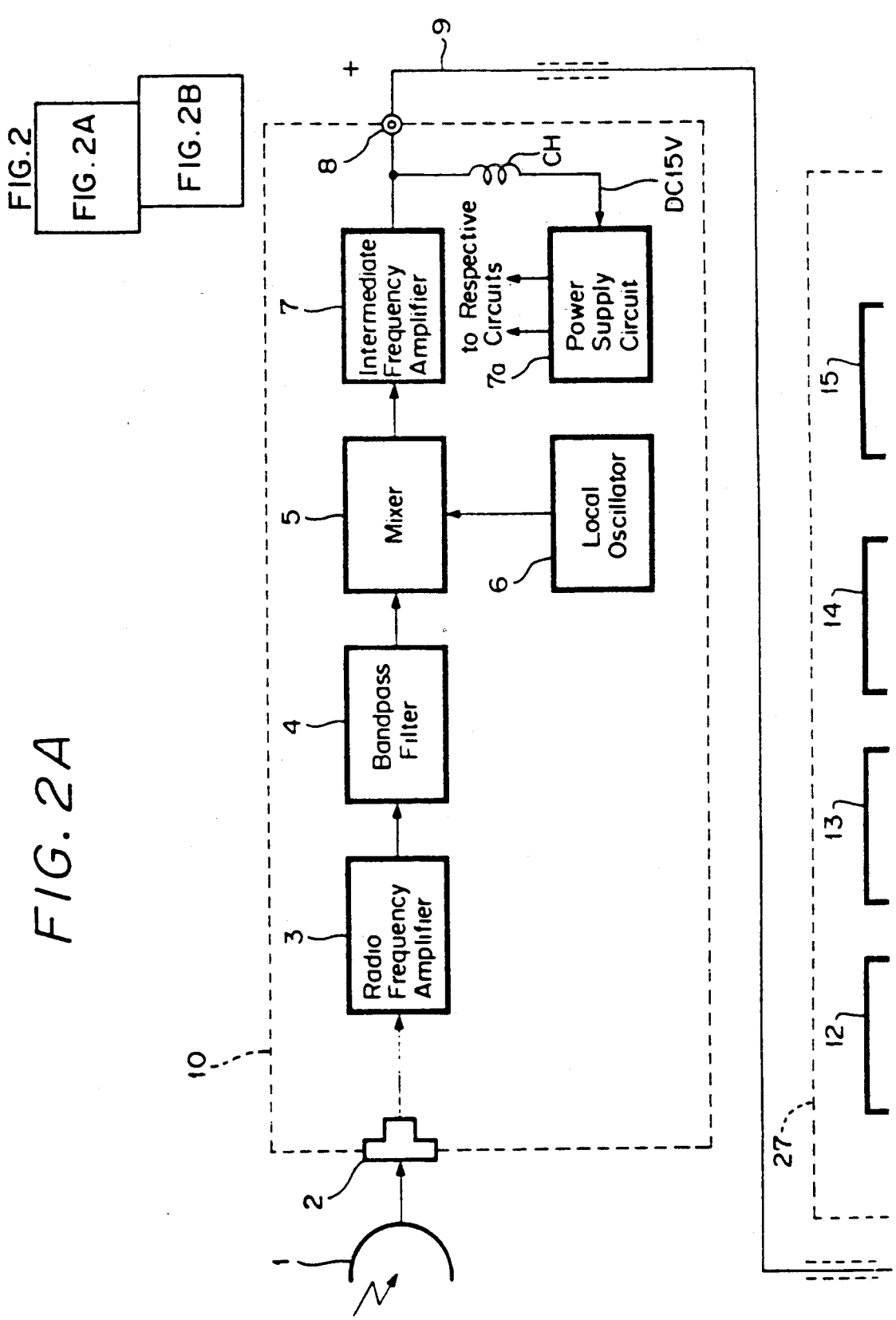

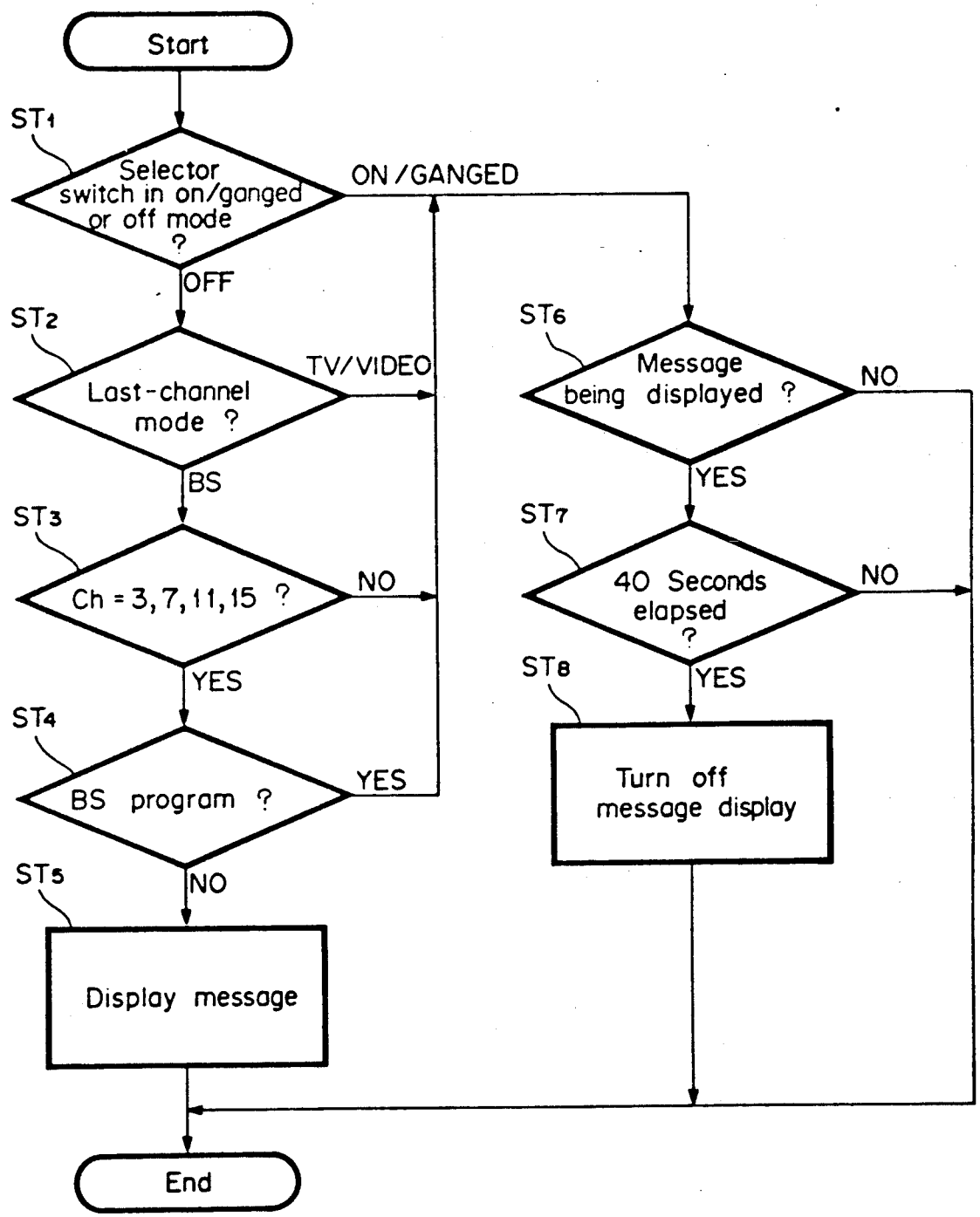

TELEVISION SET WITH SATELLITE BROADCAST RECEIVER

BACKGROUND OF THE INVENTION

1. Field of the Invention

The present invention relates to a television set with a satellite broadcast (BS) receiver, and more particularly to such a television set which has means for displaying a BS converter power supply condition.

2. Description of the Prior Art

Recently, satellite broadcasting has been finding widespread use. FIG. 1A shows one conventional satellite broadcast receiver. A satellite broadcast signal in a frequency range of 12 GHz transmitted by a satellite is received by a BS antenna 1 such as a parabola antenna which is erected outdoors. The satellite broadcast signal received by the antenna 1 is converted into a BS-IF signal, in a frequency range from 1 to 1.3 GHz by a BS converter 10, and the BS-IF signal is supplied through a coaxial cable 9 to a BS tuner 27 which is positioned indoors. In the BS tuner 27, a desired satellite broadcast channel is selected from the BS-IF signal and demodulated into a video signal and an audio signal, which are then supplied to an AV (audio/video) television set (hereinafter referred to as "AVTV") 30. The viewer of the AVTV 30 can now see video images and sounds selected by the BS tuner 27 on the AVTV 30.

The BS converter 10 does not have a rectifier circuit and a power supply transformer unlike a conventional power supply system such as a booster or the like, but is supplied with a DC voltage of 15 V from the BS tuner 27 for operation. The BS converter 10 with such a power supply system is reduced in size and weight, can easily be mounted on the BS antenna 1, and hence suffers less hum modulation. In the power supply system, the inner conductor of the coaxial cable 9 which interconnects the BS tuner 27 and the BS converter 10 is connected to the positive terminal of a power supply in the BS tuner 27, for supplying the voltage from the power supply to the BS converter 10.

The BS tuner 27 has on its back panel a manually operable selector switch for selectively supplying the DC voltage of 15 V from the power supply to the BS converter 10. The selector switch may select various modes depending on how the BS antenna 1 is connected to various devices. More specifically, the selector switch may be selectively shifted into "OFF", "ON" and "GANGED" positions. For example, as shown in FIG. 1A, when there is only one AVTV 30 and BS converter 10 is connected to only the tuner 27 as in usual home-use applications, the selector switch is shifted into the "GANGED" position. FIG. 1B shows an application in which programs broadcast from the satellite are viewed in different rooms at the same time. Specifically, in such an application, another BS tuner 27a and another AVTV 30a are added to the existing BS tuner 27 and AVTV 30. If the BS converter 10 were supplied with the power supply voltage from both the BS tuners 27, 27a through a distributor 29 and the coaxial cable 9, then the BS converter 10 might fail to operate properly. To avoid such a problem, the selector switch of the BS tuner 27a is shifted into the "OFF" position, and the selector switch of the BS tuner 27 is shifted into the "ON" position. Another power supply system for a BS converter that is shared by a plurality of BS converters is shown in FIG. 1C. The BS converter 10 on the BS antenna 1 which is erected on the roof of a building 31 is connected to wall terminals 33a, 33b, 33c, . . . coupled to the BS tuners 27, 27a, . . . through a distributor 29 and a booster 32. The BS converter 10 is supplied with a power supply voltage from the booster 32. Therefore, the selector switches of the respective BS tuners 27, 27a, . . . are shifted into the "OFF" position.

With each of the conventional power supply arrangements, since the selector switch for selecting one of the selectable switch positions is disposed on the back panel of each BS tuner, the selected position and function of the selector switch cannot easily be recognized. Inasmuch as the selector switch is generally not easy to handle and different power supply systems such as shown in FIGS. 1B and 1C may be employed, the selector switch of each BS tuner is held in the "OFF" position when the BS tuner is shipped from the factory. Not knowing that the selector switch is in the "OFF" position, the user of a brand-new BS tuner may complain about the failure of the BS tuner to reproduce video and audio signals through the AVTV.

OBJECTS AND SUMMARY OF THE INVENTION

In view of the aforesaid drawbacks of the conventional BS tuner, it is an object of the present invention to provide a television set with a satellite broadcast receiver, the television set having means for displaying, in addition to a menu, a message for preventing any trouble from occurring due to improper selector switch handling.

According to the present invention, there is provided a television set comprising display means for displaying video information including a menu function, a BS converter for converting a BS signal into a BS-IF signal, and a BS tuner for producing video and audio signals from the BS-IF signal, the BS tuner including control means for selectively supplying a power supply voltage from the BS tuner to the BS converter through a signal transmission line, and a selector switch for selecting one of an "ON" mode in which the power supply voltage is to be supplied to the BS converter and an "OFF" mode in which the power supply voltage is not to be supplied to the BS converter, the control means including decision means for determining whether there is a BS program being received or not, the control means comprising means for displaying on the display means a message indicating that the power supply voltage is not supplied to the BS converter if the selector switch is selecting the "ON" mode and no BS program is being received as determined by the decision means.

If the selector switch is in the "OFF" mode when the satellite broadcast receiver, which includes the BS tuner and the BS converter, is newly installed the display means displays the message, which may be "NO VOLTAGE SUPPLIED TO CONVERTER POWER SUPPLY", allowing the user to recognize the power supply condition of the BS converter.

The above and other objects, features, and advantages of the present invention will become apparent from the following description of an illustrative embodiment thereof to be read in conjunction with the accompanying drawings, in which like reference numerals represent the same or similar objects.

BRIEF DESCRIPTION OF THE DRAWINGS

FIG. 3 is a flowchart of operation of the television set shown in FIG. 2.

DETAILED DESCRIPTION OF THE PREFERRED EMBODIMENT

Figure 2B:
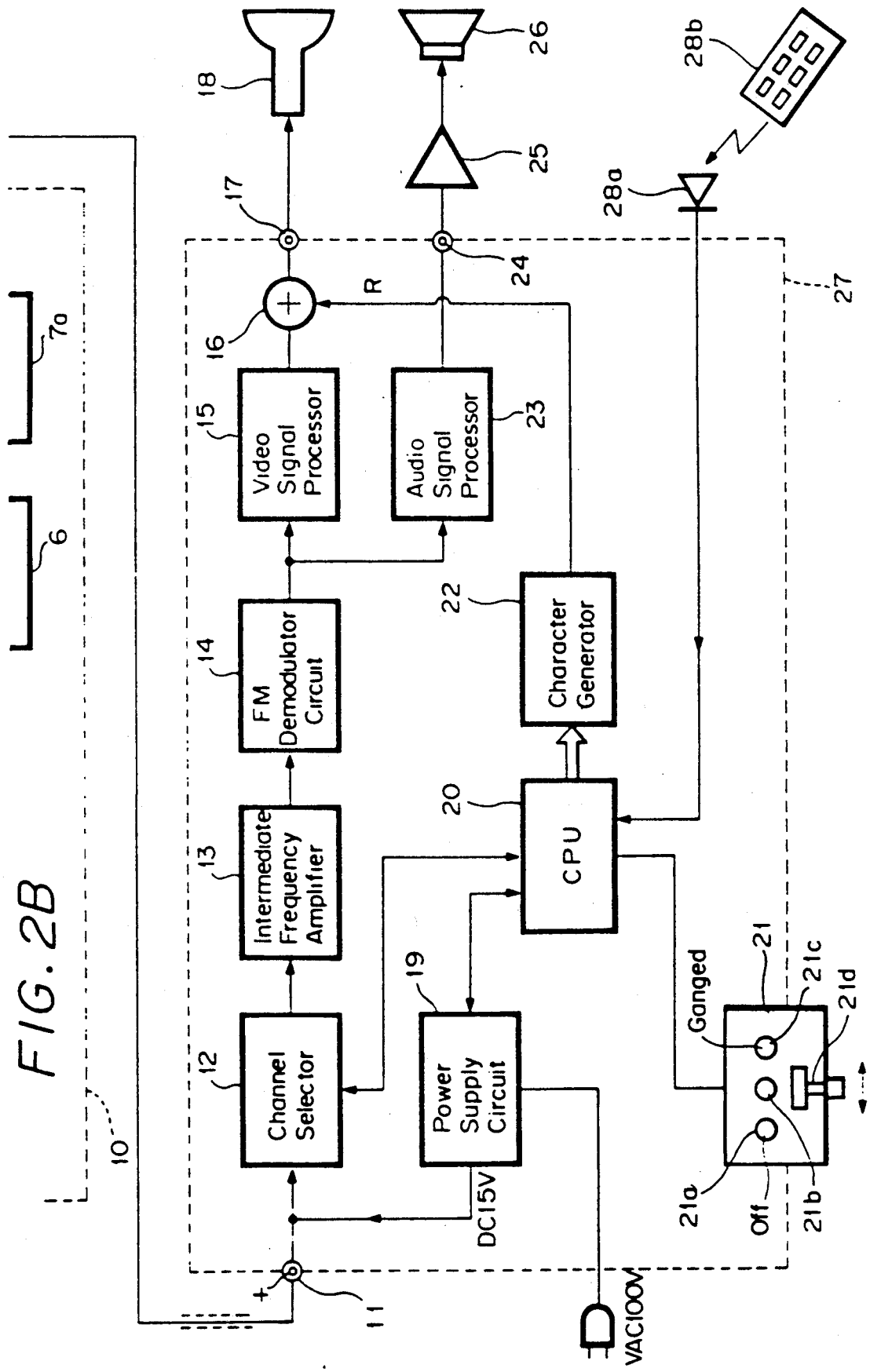
FIG. 2 is block diagram formed of FIGS. 2A and 2B showing a television set with a satellite broadcast receiver according to the present invention.

FIG. 2 is formed of block diagrams 2A and 2B and shows in block form a television set with a satellite broadcast receiver according to the present invention.

As shown in FIG. 2, a satellite broadcast signal in a frequency range of 12 GHz transmitted by a satellite is reflected by a BS antenna 1 such as a parabola or planar antenna, then received by a primary radiator, and supplied to a circular-to-linear polarized wave converter 2 which converts a circular polarized wave into a linear polarized wave. The circular-to-linear polarized wave converter 2 supplies a radio-frequency output signal in a frequency range of 12 GHz to a radio-frequency amplifier 3 in a BS converter 10. The radio-frequency amplifier 3 supplies an amplified signal through a bandpass filter 4 to a mixer 5. In the mixer 5, the signal supplied from the bandpass filter 4 is mixed with a signal from a local oscillator 6, producing a BS-IF signal in a frequency range of 1 GHz. The BS-IF signal from the mixer 5 is amplified by an intermediate-frequency amplifier 7, and the amplified signal is applied to an output terminal 8 of the BS converter 10.

The output terminal 8 is connected to one terminal of a coaxial cable 9 whose other terminal is coupled to an input terminal 11 of a BS tuner 27. The output terminal 8 includes an inner conductor as a positive terminal which is connected to a power supply circuit 19 in the BS tuner 27 through the coaxial cable 9. The inner conductor of the output terminal 8 is supplied with a DC voltage of 15 V from the power supply circuit 19 through the coaxial cable 9. The BS converter 10 has a power supply circuit 7A for supplying electric energy to the various circuits in the BS converter 10, the power supply circuit 7A being connected to the inner conductor of the outer terminal 8 through a choke coil CH. Therefore, the power supply circuit 7A does not have a rectifier circuit, a transformer, etc. and is small in size and weight and suffers less hum modulation.

The BS-IF signal from the output terminal 8 is supplied through the coaxial cable 9 to the input terminal 11 of the BS tuner 27. Then, the BS-IF signal is supplied to a channel selector 12, which selects a desired channel from a range of channels, e.g., Channels 1 through 15, which are represented by the BS-IF signal. The channel selector 12 includes a radio-frequency amplifier, a mixer, and a local oscillator. The mixer and the local oscillator convert the BS-IF signal into an intermediate-frequency signal having a frequency of 134.26 or 402.78 MHz. The oscillation frequency of the local oscillator is 1.5 GHz, and is variable depending on the channel which is received. The intermediate-frequency signal is then supplied to a next intermediate-frequency amplifier 13. The intermediate-frequency amplifier 13 has an intermediate-frequency filter for removing unwanted signals other than the received channel. After the unwanted signals are removed, the intermediate-frequency signal is amplified, and then processed by an AGC circuit and adjusted to a certain signal level by an amplitude limiter, suppressing AM noise components. The signal is thereafter demodulated into a frequency-demodulated signal by a frequency demodulator 14. The frequency-demodulated signal from the frequency demodulator 14 is supplied to a video signal processor 15 and an audio signal processor 23. The video signal processor 15 extracts a video signal from a baseband signal in the frequency-demodulated signal. The extracted video signal is supplied to a video output terminal 17 of the BS tuner 27, from which it is supplied to a display unit 18 such as a CRT or the like for displaying video images. The audio signal processor 23 demodulates a PCM audio signal which has been transmitted by 4-phase differential phase shift keying. The demodulated audio signal is supplied to an audio output terminal 24 of the BS tuner 27 and then amplified by a driver amplifier 25. The amplified audio signal is then supplied to a loudspeaker 26 to reproduce and radiate sounds.

The BS tuner 27 also has a control unit 20 such as a microcomputer (CPU) that controls a character generator (CG) 22 connected thereto to supply a message to be displayed which is generated thereby, to one of red (R), green (G), and blue (B) output terminals of the video signal processor 15. For example, the generated message is supplied to the red (R) output terminal of the video signal processor 15 to enable the CRT 18 to display a message in red. To the CPU 20, there is connected a photodetector 28a for detecting a command from a remote controller 28b, so that the CPU 20 can receive command data from the remote controller 28b. The CPU 20 also controls the power supply circuit 19, which includes a regulated power supply, and the channel selector 12.

The DC voltage of 15 V which is supplied from the power supply circuit 19 to the BS converter 10 is transmitted through the inner conductor of the coaxial cable 9 that is connected to the input terminal 11.

A selector switch 21 is mounted on the back panel of the BS tuner 27. A signal indicative of the state of operation of the selector switch 21 is supplied to the CPU 20. More specifically, the selector switch 21 has a slider 21d which is slidable in the direction indicated by one of the arrows at a time. When the slider 21d is slid into contact with a fixed contact 21a, an "OFF" mode is selected and a signal indicative of the "OFF" mode is supplied from the selector switch 21 to the CPU 20. When the slider 21d is slid into contact with a fixed contact 21b, an "ON" mode is selected and a signal indicative of the "ON" mode is supplied from the selector switch 21 to the CPU 20. When the slider 21d is slid into contact with a fixed contact 21c, a "GANGED" mode is selected and a signal indicative of the "GANGED" mode is supplied from the selector switch 21 to the CPU 20. In the "OFF" mode, the DC voltage of 15 V is not supplied from the power supply circuit 19 to the power supply circuit 7A in the BS converter 10 under the control of the CPU 20. In the "ON" or "GANGED" mode, the DC voltage of 15 V is supplied from the power supply circuit 19 to the power supply circuit 17A under the control of the CPU 20.

Operation of the television set according to the present invention will be described below with reference to FIG. 3. In a first step ST1, the CPU 20 determines whether the slider 21d of the selector switch 21 is held in contact with the fixed contact 21b or 21c, indicating the "ON" or "GANGED" mode, or with the fixed contact 21a, indicating the "OFF" mode. If the selector switch 21 is in the "OFF" mode, then control goes to a second step ST2 in which the CPU 20 determines whether a last-channel mode is a television/video mode or a BS (broadcast from satellite) mode. If the last-channel mode is the BS mode, then the CPU 20 determines in a step ST3 whether the channel being received is one of Channels 3, 7, 11, and 15, through a bus between the channel selector 12 and the CPU 20. If the channel is one of Channels 3, 7, 11, and 15 (which may be all the odd-numbered channels), then control proceeds to a step ST4 which determines whether there is a BS program being received. If no BS program is being received, then the CPU 20 supplies the message from the character generator 22 to the mixer 16, for enabling the CRT 18 to display the message, which may be "NO VOLTAGE SUPPLIED TO CONVERTER POWER SUPPLY", in a step ST5. Thereafter, control goes to an end. If the selector switch 21 is in the "ON" or "GANGED" mode in the step ST1, or if the last-channel mode is the television/video mode in the step ST2, or if the channel being received is not one of Channels 3, 7, 11, and 15 in the step ST3, or if there is a BS program being received in the step ST4, then control goes to a step ST6 in which the CPU 20 determines whether the message is being displayed on the CRT 18. If the message is being displayed, then the CPU 20 determines in a step ST7 whether 40 seconds have elapsed since the start of the message being displayed. If 40 seconds have elapsed, then the CPU 20 turns off the message display in a step ST8, and control is brought to an end. If the message is not being displayed in the step ST6 or if 40 seconds have not elapsed yet in the step ST7, then control is ended.

Figure 1A:
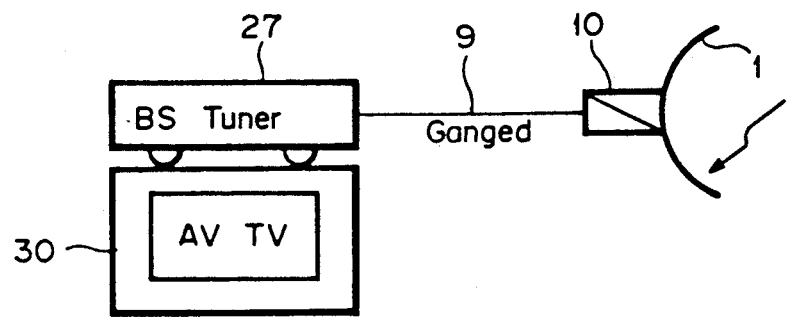
FIGS. 1A through 1C are block diagrams of conventional arrangements in which a BS tuner with a selector switch or BS tuners with selector switches are connected to a BS converter.
Figure 1B:
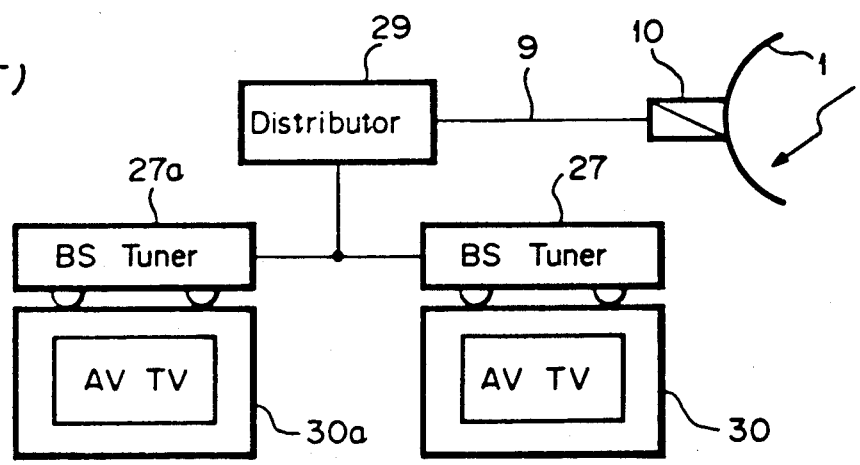
Figure 1C:
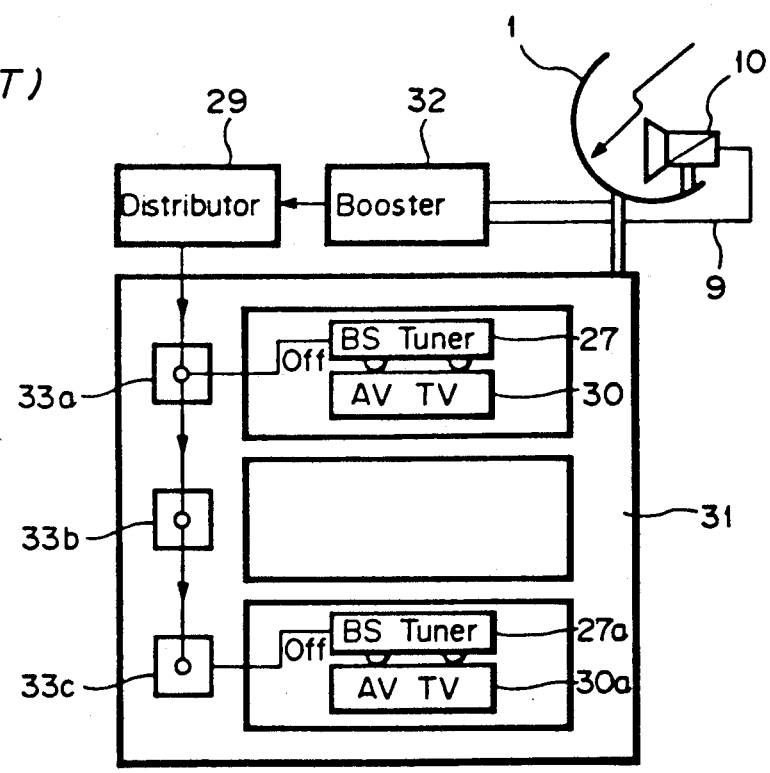

In the illustrated flowchart, the message is displayed only if the selector switch 21 is in the "OFF" mode in the step ST1, if the last-channel mode is the BS mode in the step ST2, if the channel being received is one of Channels 3, 7, 11, and 15, and if there is a BS program being received. However, the message may be displayed if the selector switch is in the "OFF" mode in the step ST1 and if there is a BS program on air in the step ST4. This alternative is effective to prevent users from complaining about the inability to receive BS programs while the selector switch 21 is being left in the "OFF" mode. In the system shown in FIG. 1c with the BS converter shared by all the BS tuners connected thereto, the selector switches are in the "OFF" mode as described above. Since there is a BS program being received, control does not proceed from the step ST4 to the step ST5, and hence the message in the step ST5 is not displayed.

The television set with satellite broadcast receiver according to the present invention allows the user to recognize the power supply condition of the BS converter. Therefore, knowing the power supply condition of the BS converter, the user will not make a complaint that no video image and sound are reproduced in BS programs while in fact the BS converter is not energized.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

I claim as my invention:

1. A television set comprising:
   display means for displaying video information including a menu function;
   a BS converter for converting a BS signal into a BS-IF signal;
   a BS tuner for producing video and audio signals from said BS-IF signal;
   said BS tuner including control means for selectively supplying a power supply voltage from said BS tuner to said BS converter through a signal transmission line, and a selector switch for selecting one of an "ON" mode in which the power supply voltage is to be supplied to said BS converter and an "OFF" mode in which the power supply voltage is not to be supplied to said BS converter;
   said control means including decision means for determining whether there is a BS program being received or not; and
   said control means comprising means for displaying on said display means a message indicating that the power supply voltage is not supplied to said BS converter if said selector switch is selecting said "ON" mode and no BS program is being received as determined by said decision means.

2. A television set according to claim 1, wherein said control means comprises a microcomputer, and said BS tuner further includes a character generator connected to said microcomputer, for generating said message.

3. A television set according to claim 2, wherein said BS tuner further includes a video signal processor for supplying the video signal to said display means, and a mixer for mixing the video signal with the message generated by said character generator.

* * * * *